(12) United States Patent
Hirakata (10) Patent No.: US 8,236,073 B2
(45) Date of Patent: Aug. 7, 2012

(54) HYDROGEN SUPPLYING APPARATUS AND METHOD FOR CONTROLLING HYDROGEN SUPPLYING APPARATUS

(75) Inventor: Shuji Hirakata, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 688 days.

(21) Appl. No.: 12/374,713

(22) PCT Filed: Aug. 2, 2007

(86) PCT No.: PCT/IB2007/002222
§ 371 (c)(1),
(2), (4) Date: Jan. 22, 2009

(87) PCT Pub. No.: WO2008/015554
PCT Pub. Date: Feb. 7, 2008

(65) Prior Publication Data
US 2010/0003559 A1    Jan. 7, 2010

(30) Foreign Application Priority Data
Aug. 3, 2006 (JP) .................. 2006-211728

(51) Int. Cl.
*H01M 8/06* (2006.01)
(52) U.S. Cl. ...................... 48/127.9; 429/408
(58) Field of Classification Search .......... 429/400–535; 422/129–242; 48/61–118.5, 127.1, 127.9, 48/197 R–197 A
See application file for complete search history.

(56) References Cited

U.S. PATENT DOCUMENTS

| | | | |
|---|---|---|---|
| 3,123,252 A | 3/1964 | Kuntz | |
| 3,634,053 A | 1/1972 | Klass et al. | |
| 2004/0126889 A1* | 7/2004 | Puri et al. | 436/3 |
| 2007/0207085 A1* | 9/2007 | Troczynski | 423/657 |

FOREIGN PATENT DOCUMENTS

| | | |
|---|---|---|
| EP | 1 935 844 A1 | 6/2008 |
| JP | 59-074188 A | 4/1984 |
| JP | 2002-029701 A | 1/2002 |
| JP | 2004-111167 A | 4/2004 |
| JP | 2004-315566 A | 11/2004 |
| JP | 2005-294229 A | 10/2005 |
| WO | WO 2005/073615 A1 | 8/2005 |
| WO | WO 2007/029748 A1 | 3/2007 |

OTHER PUBLICATIONS

Translation of JP 59074188 A, Terasaki Tajiro, Method and Appatus for Addition of Odorant to Fuel Gas, 1984.*
Office Action issued Feb. 28, 2012 in JP 2006-211728 and English translation thereof.

* cited by examiner

*Primary Examiner* — Imran Akram
(74) *Attorney, Agent, or Firm* — Kenyon & Kenyon LLP (57) ABSTRACT

A hydrogen supply apparatus includes a hydrogen supply path by which hydrogen released from a hydrogen tank reaches a hydrogen supply target, a branching path from the hydrogen supply path, in which a part of hydrogen released from the hydrogen tank flows, addition means for adding an odorizing agent to the hydrogen flowing in the branching path, a buffer tank storing the hydrogen to which the odorizing agent is added by the addition means, and supplying means for supplying the odorizing agent treated hydrogen in the buffer tank to the hydrogen supply path.

19 Claims, 8 Drawing Sheets

HYDROGEN SUPPLYING APPARATUS AND METHOD FOR CONTROLLING HYDROGEN SUPPLYING APPARATUS

This is a 371 national phase application of PCT/IB2007/002222 filed 2 Aug. 2007, claiming priority to Japanese Patent Application No. 2006-211728 filed 3 Aug. 2006, the contents of which are incorporated herein by reference.

BACKGROUND OF THE INVENTION

1. Field of the Invention

The present invention relates to a hydrogen supplying apparatus and to a method for controlling a hydrogen supplying apparatus.

2. Description of the Related Art

In a conventional hydrogen supplying apparatus, such as proposed in Japanese Patent Application Publication No. 2004-111167 (JP-A-2004-111167), hydrogen that contains high-concentration odorizing agent is added to pure hydrogen released from a tank in response to the odorizing agent concentration in the hydrogen flowing in an odorized hydrogen circulation path, which includes the target of the hydrogen supply (for example, a fuel cell), to control the odorizing agent concentration in the hydrogen supplied to the target of the hydrogen supply and is supplied to the odorized hydrogen circulation path.

In the art described in the Japanese Patent Application Publication No. 2004-111167 (JP-A-2004-111167), an odorizing agent treated hydrogen tank that stores hydrogen into which is mixed a high-concentration odorizing agent is required. Because the odorizing agent treated hydrogen tank stores hydrogen and the odorizing agent, its size increases, leading to an increase in the size of the system. Considering this point, because if the odorizing agent treated hydrogen tank is made small, the amount of stored odorizing agent becomes less than if only the odorizing agent is stored, there is a possibility that the cycle of replenishing the tank with odorizing agent treated hydrogen (replacing the odorizing agent treated hydrogen tank) becomes short. Also, in the art of the Japanese Patent Application Publication No. 2004-111167 (JP-A-2004-111167), because the amount of odorizing agent treated hydrogen mixed with the pure hydrogen is not considered, there is a possibility of variations occurring in the odorizing agent concentration in the hydrogen supplied to the odorizing agent treated hydrogen circulation path.

SUMMARY OF THE INVENTION

The present invention provides a hydrogen supply apparatus and control method that can suppress an increase in the size of the apparatus and can lengthen the cycle of replenishing the odorizing agent tank with odorizing agent.

The present invention also provides a hydrogen supply apparatus and control method that is able to supply hydrogen, in which non-uniformity of an odorizing agent concentration is suppressed, to the hydrogen supply target.

Aspects of the present invention adopt the following configurations.

A hydrogen supply apparatus according to first aspect of the present invention includes a hydrogen tank; a hydrogen supply path through which hydrogen from the hydrogen tank is supplied to a hydrogen supply target; a branching path that branches from the hydrogen supply path, in which a portion of the hydrogen supplied from the hydrogen tank flows; addition means for adding an odorizing agent to the hydrogen flowing in the branching path; a buffer tank that stores the odorizing agent treated hydrogen; and supplying means for supplying the odorizing agent treated hydrogen stored in the buffer tank to the hydrogen supply path.

According to the first aspect of the present invention, the odorizing agent is added to hydrogen at the branching path, after storing it at the buffer tank to approach a uniform concentration of odorizing agent, and the odorizing agent treated hydrogen in the buffer tank is fed to the hydrogen supply path and mixed with hydrogen flowing in the hydrogen supply path. By doing this, the odorizing agent treated hydrogen tank as in conventional art is not required, thereby enabling a reduction in the size of the apparatus and lengthening of the cycle of replenishing the tank with odorizing agent.

A hydrogen supply target according to the first aspect of the present invention is a fuel cell, wherein the supplying means may supply the odorizing agent treated hydrogen, in accordance with a hydrogen consumption amount in the fuel cell, to the hydrogen supply path. Alternatively, the supplying means according to the first aspect of the present invention may supply an amount of the odorizing agent treated hydrogen, based on a generated electrical current in the fuel cell that is a hydrogen supply target, to the hydrogen supply path. By doing this, it is possible to add the odorizing agent to hydrogen in proportion to the hydrogen consumption amount and generated electrical current, thereby suppressing non-uniformity of an odorizing agent concentration in the hydrogen.

A hollow fiber module having an aperture with respect to the hydrogen supply path may be disposed in the hydrogen supply pass according to the first aspect of the present invention, and the supplying means may supply the odorizing agent treated hydrogen into the hollow fiber module. By doing this, it is possible to mix the odorizing agent treated hydrogen diffused in the hollow fiber module into the hydrogen that flows in the hydrogen supply path, thereby uniformly mixing the odorizing agent into the hydrogen.

The hydrogen supply apparatus according to the first aspect of the present invention may further include means for adjusting a contact surface area between the hydrogen flowing in the hydrogen supply path and the odorizing agent treated hydrogen that is supplied into the hydrogen supply path by the supplying means. By doing this, it is possible to adjust a supply amount of the odorizing agent with respect with the hydrogen.

The first aspect of the present invention may be a configuration in which a plurality of hollow fiber modules having apertures with respect to the hydrogen supply path are disposed therein, each hollow fiber modules may have a different aperture surface area. In addition, the supplying means may include a plurality of supply inlets that supply the odorizing agent treated hydrogen into the hollow fiber modules.

The first aspect of the present invention may further include hydrogen flow amount measuring means disposed upstream from a branching point of the hydrogen supply path and the branching path, and may be configured so that the addition means adds an odorizing agent in accordance with a hydrogen flow amount measured by the hydrogen flow amount measuring means. By doing this, it is possible to add the odorizing agent in accordance with the hydrogen amount supplied to the fuel cell.

The configuration of the addition means according to the first aspect of the present invention may include an odorizing agent storage tank, and a valve that, when closed, blocks a flow between the branching path and the odorizing agent tank, and that, when open, forms a flowing passage in which a portion of the hydrogen flowing in the branching path is introduced into the odorizing agent storage tank and, after coming into contact with the odorizing agent in the odorizing agent storage tank, returns to the branching path.

The configuration of the addition means according to the first aspect of the present invention may include an odorizing agent storage tank, a hollow fiber module disposed in the branching path and having an aperture opening with respect to the branching path, and odorizing agent supplying means for supplying the odorizing agent in the odorizing agent storage tank into the hollow fiber module.

The addition means according to the first aspect of the present invention may include an odorizing agent storage tank, a plurality of hollow fiber modules disposed in the branching path and having apertures opening with respect to the branching path, and a plurality of odorizing agent supplying means for supplying the odorizing agent in the odorizing agent storage tank into the hollow fiber modules. The plurality of hollow fiber modules may have mutually different aperture surface areas.

By adopting the above-described configuration of the addition means, it is possible to supply odorizing agent treated hydrogen with suppressed non-uniformity of the odorizing agent concentration into the buffer tank. This can miniaturize the capacity of buffer tank.

The second aspect of the present invention is a method for controlling hydrogen supply in the hydrogen supply apparatus of the first aspect, which includes supplying the odorizing agent treated hydrogen to the hydrogen supply path, in accordance with a hydrogen consumption amount in the hydrogen supply target.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Embodiments of the present invention are described below, with reference made to the accompanying drawings. These embodiments are examples, and do not restrict the configuration of an embodiment of the present invention.

An embodiment of the present invention will now be generally described, using a fuel cell system that uses hydrogen as a fuel gas, in which an odorizing agent is added to the hydrogen gas to facilitate the detection of hydrogen leakage. In this embodiment, a hydrogen supplying apparatus and a method for controlling the hydrogen supplying apparatus that adds a minute amount of odorizing agent to hydrogen in response to the hydrogen consumption amount (fuel cell current) of the fuel cell will be described.

The hydrogen supplying apparatus of this embodiment has the following features. The hydrogen ($H_2$) and the odorizing agent are mixed (agitated) in a buffer tank, and the odorizing agent treated hydrogen in the buffer tank is fed (for example, injected) to a hydrogen supply path to the fuel cell in response to the hydrogen consumption amount (fuel cell current). The contact surface between the hydrogen and the odorizing agent is adjusted by using a butterfly valve and a hollow fiber with a different aperture surface area (hole diameter and hole density), to adjust the odorizing agent concentration in the hydrogen.

Figure 1:
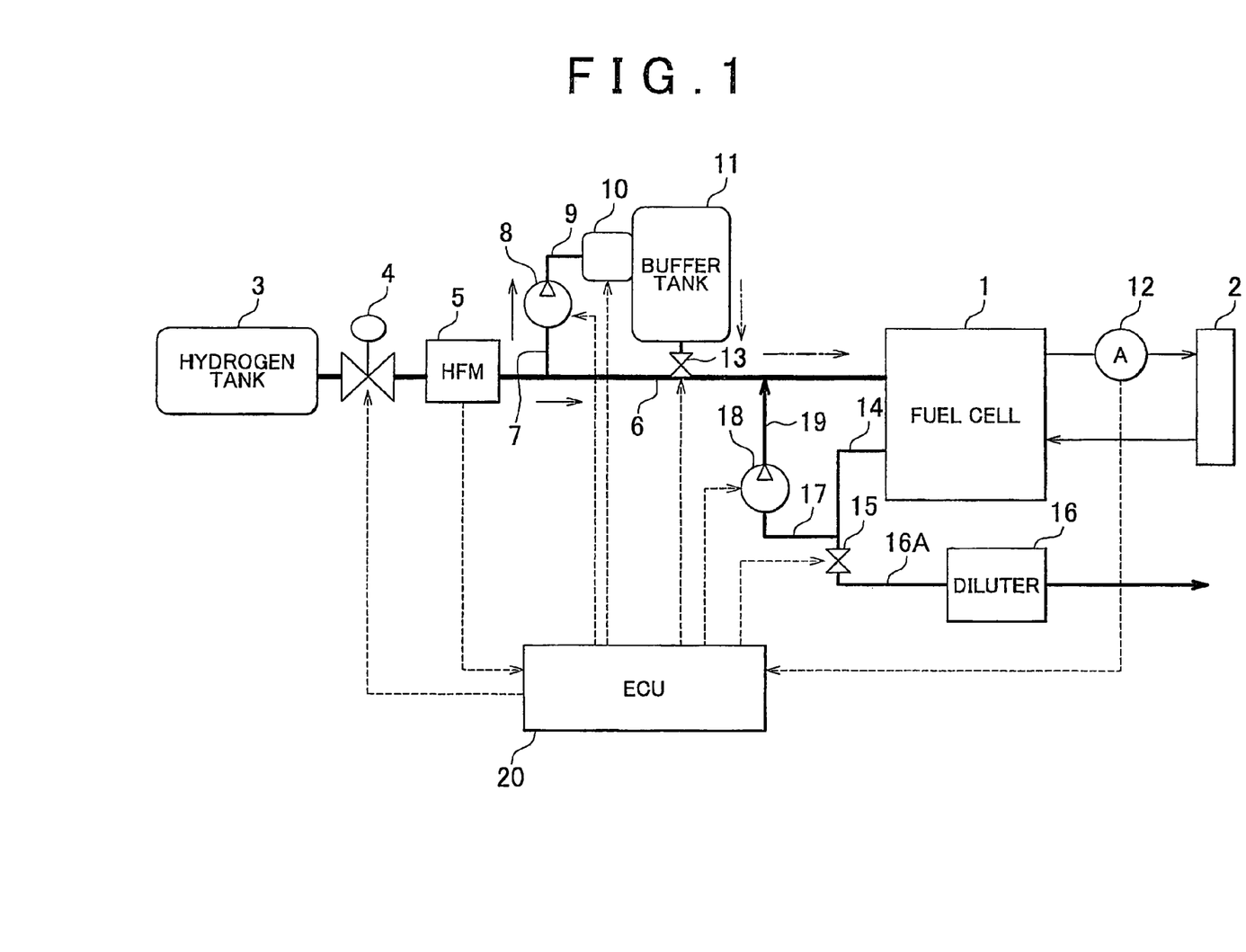
FIG. 1 shows the configuration of a fuel cell system to which a hydrogen supplying apparatus according to a first embodiment of the present invention may be applied.

The configuration of the fuel cell system will now be described. FIG. 1 shows an example of the configuration of a fuel cell system to which a hydrogen supplying apparatus according to the present invention is applied. The fuel cell system shown in FIG. 1 is mounted on board a vehicle, although the hydrogen supplying apparatus may also be applied to a stationary type of fuel cell system. The fuel cell 1 shown in FIG. 1 is a solid polymer electrolyte fuel cell (PEFC), although the present invention is not limited in application to a PEFC. The present invention may be applied to a hydrogen supply target other than a fuel cell.

In FIG. 1, the fuel cell 1 has a cell stack formed by stacking a plurality of cells. Each cell has a solid polymer electrolyte membrane, a fuel electrode (anode) and an air electrode (oxidant electrode: cathode) that sandwich the solid polymer electrolyte membrane from each side, and a fuel electrode side separator and air electrode side separator that sandwich the fuel electrode and the air electrode.

The fuel electrode has a diffusion layer and a catalyst layer. Fuel containing hydrogen, such as hydrogen gas or a hydrogen-rich gas, is supplied to the fuel electrode by a fuel supply system. The fuel supplied to the fuel electrode diffuses in the diffusion layer and reaches the catalyst layer. At the catalyst layer, the hydrogen is separated into protons (hydrogen ions) and electrons. The hydrogen ions pass through the solid polymer electrolyte membrane and migrate to the air electrode, and the electrons pass through an external circuit and migrate to the air electrode.

The air electrode has a diffusion layer and a catalyst layer, and an oxidizing gas such as air is supplied to the air electrode by an oxidizing gas supply system. The oxidizing gas supplied to the air electrode is diffused by the diffusion layer and reaches the catalyst layer. At the catalyst layer, a reaction between the oxidizing gas, the hydrogen ions that pass through the solid polymer electrolyte membrane and reach the air electrode, and electrons that pass through the external circuit and reach the air electrode produces water. The electrons passing through the external circuit when the reaction occurs at the fuel electrode and the air electrode are used as electrical energy for a load 2 that is connected between the terminals of the cell stack of the fuel cell 1.

A fuel supply/discharge system is connected to the fuel cell 1 to supply and discharge fuel. The fuel cell 1 is also connected to an oxidant supply/discharge system that supplies and discharges an oxidant. In FIG. 1 the fuel supply/discharge system is shown, the configuration of which is described below.

The fuel supply system has a hydrogen supply path, which supplies hydrogen gas, stored under high pressure in the hydrogen tank 3, from the hydrogen tank 3 to a fuel inlet provided in the fuel cell 1. The hydrogen supply path has an adjusting valve 4 that is connected to the hydrogen tank 3 and that adjusts the flow amount of hydrogen gas supplied from the hydrogen tank 3, a hydrogen flow meter (HFM) 5 that measures the flow amount of hydrogen passing through the adjusting valve 4, and a pipe 6 that connects the hydrogen flow meter 5 and the fuel cell 1.

The hydrogen supply system also has a branching path that branches from the hydrogen supply path. The branching path has a branch pipe 7 that branches from the pipe 6; a pump 8 connected to the branch pipe 7; a pipe 9; an addition unit 10 for addition an odorizing agent connected to the pump 8 via the pipe 9; a buffer tank 11 that stores hydrogen to which odorizing agent has been added (odorizing agent treated hydrogen) by the addition unit 10; and an injector 13 that serves as a supplying means to inject (supply) the odorizing agent treated hydrogen from the buffer tank 11 into the a pipe 6.

The fuel discharge system has the following configuration. A discharge valve (for example, an electromagnetic valve) 15 is connected to the fuel outlet of the fuel cell 1 via the pipe 14. The discharge valve 15 is connected to a diluter 16 via a pipe 16A. A circulating pump 18 is connected to the pipe 14 via the branching pipe 17, and the circulating pump 18 is connected to the pipe 6 via the pipe 19. By adopting this configuration, when the discharge valve 15 is in the closed condition, by the driving of the circulating pump 18, the hydrogen gas discharged from the fuel cell 1 passes through the pipe 17, the circulating pump 18, the pipe 19, and the pipe 6, and is again supplied to the fuel cell 1, so that the hydrogen gas circulates via a circulation path through the fuel cell 1. In contrast, when the discharge valve 15 is open, the hydrogen gas discharged to the pipe 14 passes through the discharge valve 15 and reaches the diluter 16 and, after it is diluted, is discharged to the atmosphere.

The operation of the fuel supplying/discharging system is controlled by a control system. The control system has an ECU (electronic control unit) 20 serving as a control means. The ECU 20 includes a processor such as a CPU, a storage device (memory, such as a volatile memory) that stores a program and data used when executing a program, and an I/O (input/output) interface.

The ECU 20, by the processor executing a program stored in the storage device, controls the operation of the fuel supply/discharge system. Data stored beforehand in the storage device, the hydrogen gas flow amount input from the hydrogen flow meter 5, and the current generated by the fuel cell 1 (fuel cell current) measured by the ammeter 12 connected in series with the fuel cell 1 are used at the time of program execution. The ECU 20 is configured to receive a signal from the hydrogen flow meter 5 indicating the hydrogen gas flow amount and a signal from the ammeter 12 indicating the fuel cell current value (these signals being shown by broken line arrows in FIG. 1).

The ECU 20, in accordance with the program, executes controls such as opening/closing control and opening adjustment (adjustment of the hydrogen gas flow amount) of the adjusting valve 4, on/off and rotational amount (ejection amount) control of the pump 8 and the circulating pump 18, opening/closing control of the discharge pump 15, operating control of the injector 13, and adjustment of the amount of odorizing agent added by the addition unit 10. To do this, the ECU 20 provides control signals (refer to the broken line arrow in FIG. 1) to the adjusting valve 4, the pump 8, the addition unit 10, the injector 13, the discharge valve 15, and the circulating pump 18.

The configuration of the hydrogen supplying apparatus will now be described. In the fuel cell system shown in FIG. 1, the constituent elements that form the hydrogen supply path and the branching path form the hydrogen supplying apparatus according to an embodiment of the present invention, the configuration of which is described below in detail.

In FIG. 1, when the fuel cell 1 is operating, hydrogen gas from the hydrogen tank 3 is supplied to the fuel cell 1 via the hydrogen supply path. When the ECU 20 opens the adjusting valve 4, the hydrogen gas supplied from the hydrogen tank 3 flows to downstream from the adjusting valve 4, where the pressure is low (the hydrogen gas is shown in FIG. 1 by the straight line arrows). The hydrogen gas passes through the pipe 6 (main pipe) and is supplied to the fuel cell 1 for use in electrical generation. When this occurs, the ECU 20 closes the discharge valve 15 and drives the circulating pump 18 as necessary to circulate the hydrogen gas in the circulation path.

Then the ECU 20 drives the pump 8 to draw a portion of the hydrogen gas flowing in the pipe 6 into the branching path (the pipe (sub-pipe) side) and the addition unit 10 acts as an addition means to add (inject) odorizing agent into the hydrogen gas, it is sent to the buffer tank 11. In the buffer tank 11 the hydrogen gas and the odorizing agent are mixed together to achieve a uniform odorizing agent concentration. The ECU 20 provides a control signal to the injector 13 serving as a supplying means to cause the injector 13 to inject the odorizing agent treated hydrogen gas held in the buffer tank 11 into the pipe 6 (refer to the configuration example 1 shown in FIG. 2). By doing this, the inside of the pipe 6 downstream from the injector 13 receives a flow of odorizing agent treated hydrogen gas which is supplied to the fuel cell 1 (in FIG. 1 and FIG. 2, the odorizing agent treated hydrogen gas is indicated by a chain line arrows).

The operation of the injector 13 is controlled based on the current generated by the fuel cell 1, which is measured by the ammeter 12 (fuel cell current, which can be treated as being equivalent to the hydrogen gas consumption amount in the fuel cell 1), and the flow amount of hydrogen gas in accordance with the generated current.

In this case, the fuel cell current value (for example, the accumulated current value per unit of time) and the hydrogen flow amount from the hydrogen tank 3 (the hydrogen flow amount to the fuel cell 1) are proportionally related. That is, the supply of hydrogen is controlled so that the greater the fuel cell current generated, the more hydrogen gas is supplied to the fuel cell 1. In accordance with the fuel cell current value received from the ammeter 12, the ECU 20 adjusts the opening of the adjusting valve 4 to cause an amount of hydrogen gas to flow downstream (to the main pipe 6) in proportion to the fuel cell current value. The flow amount of hydrogen gas passing through the adjusting valve 4 is measured by the hydrogen flow meter 5 and notification is given thereof to the ECU 20.

The ECU 20 controls the operation of the addition unit 10 to add an amount of odorizing agent that is proportional to the flow amount of the hydrogen gas. The ECU 20 controls the injection operation of the injector 13 to achieve a uniform odorizing agent concentration in the hydrogen gas that passes through the pipe 6 and is supplied to the fuel cell 1.

Figure 3:
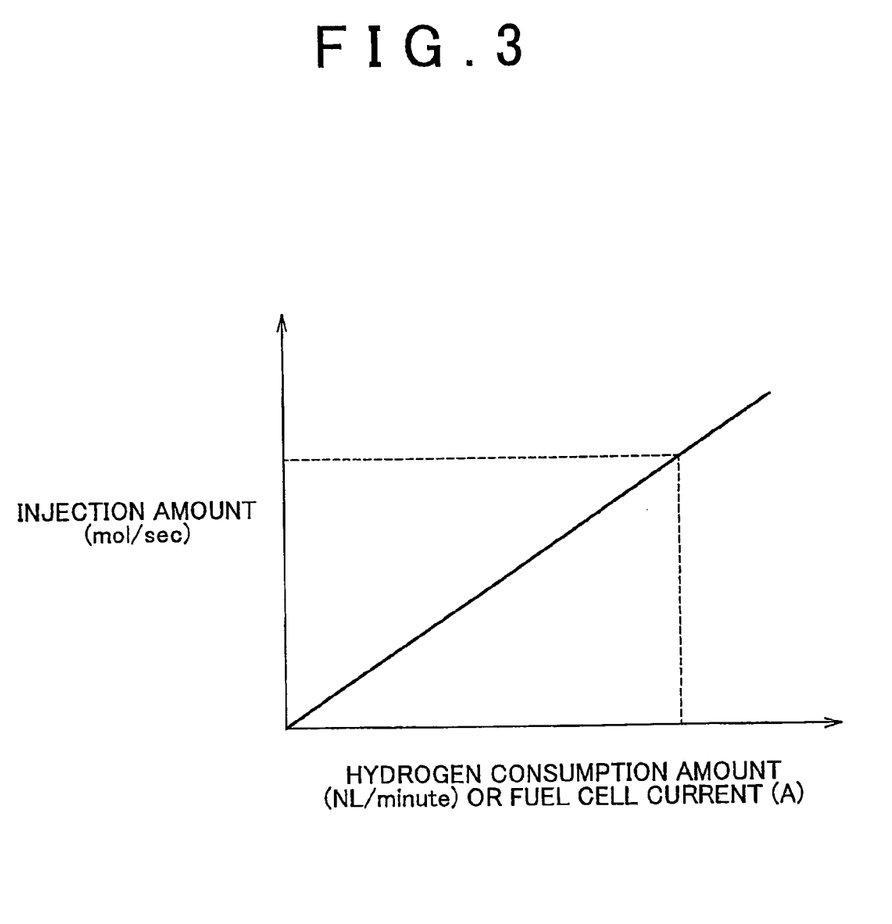
FIG. 3 is a graph showing the relationship between the fuel cell current value (hydrogen consumption amount) and the injection amount.

The injector 13 is configured to inject, with each injection, a minute amount of odorizing agent treated hydrogen gas into the pipe 6. For example, the ECU 20 varies the amount of odorizing agent treated hydrogen gas injected or the number of injections of the injector 13 in accordance with the hydrogen gas flow amount measured by the hydrogen flow meter 5. FIG. 3 is a graph showing the relationship between the fuel cell current value (hydrogen consumption amount) and the injection amount. For example, as shown in FIG. 3, the ECU 20 controls the injection amount of the injector 13 in proportion to the fuel cell current value (hydrogen consumption amount). In this manner the mixture ratio of odorizing agent and hydrogen is adjusted to supply the fuel cell 1 with an odorizing agent treated hydrogen gas having a uniform odorizing agent concentration.

In this embodiment, the example shown is one in which even if the liquid odorizing agent accumulates in the buffer tank 11, the injector 13 is applied so that the odorizing agent can be atomized and supplied into the pipe 6. As long as it is possible to adjust the amount of odorizing agent treated hydrogen gas supplied into the pipe 6, it is possible to apply a valve such as an electromagnetic valve in place of the injector 13.

The addition unit 10 has an odorizing agent tank that stores odorizing agent. The odorizing agent inside the odorizing agent tank comes into contact with the hydrogen gas flowing in the branching path (pipe 9) to add the odorizing agent to the hydrogen gas. It is possible to store in the odorizing agent tank odorizing agent in gas, liquid, or solid (gel) form. The capacity of the odorizing agent tank can be made smaller than the capacity of a tank of storing odorizing agent treated hydrogen. In particular, when storing odorizing agent that is a liquid or a solid (gel), it is possible to make the odorizing agent tank small, and to lengthen the replacement time cycle (odorizing agent replenishment period) for the odorizing agent tank.

The addition unit 10 adds odorizing agent by, for example, causing the odorizing agent in the odorizing agent tank to come into contact with the hydrogen gas flowing through the pipe 9. Alternatively, the addition unit 10 may have a configuration such that it adds an odorizing agent by injecting a gas or mist odorizing agent into the flow of hydrogen gas within the pipe 9.

The buffer tank 11, for example, may cause a swirl within the buffer tank 11 by the collision between hydrogen gas introduced from the addition unit 10 and odorizing agent at the inner wall thereof, the odorizing agent being thereby stirred and distributed uniformly throughout the hydrogen gas. Alternatively, a configuration may be adopted in which a stirring vane (stirring member) is disposed in the buffer tank 11 to mix the hydrogen gas and odorizing agent in the buffer tank 11.

Figure 2:
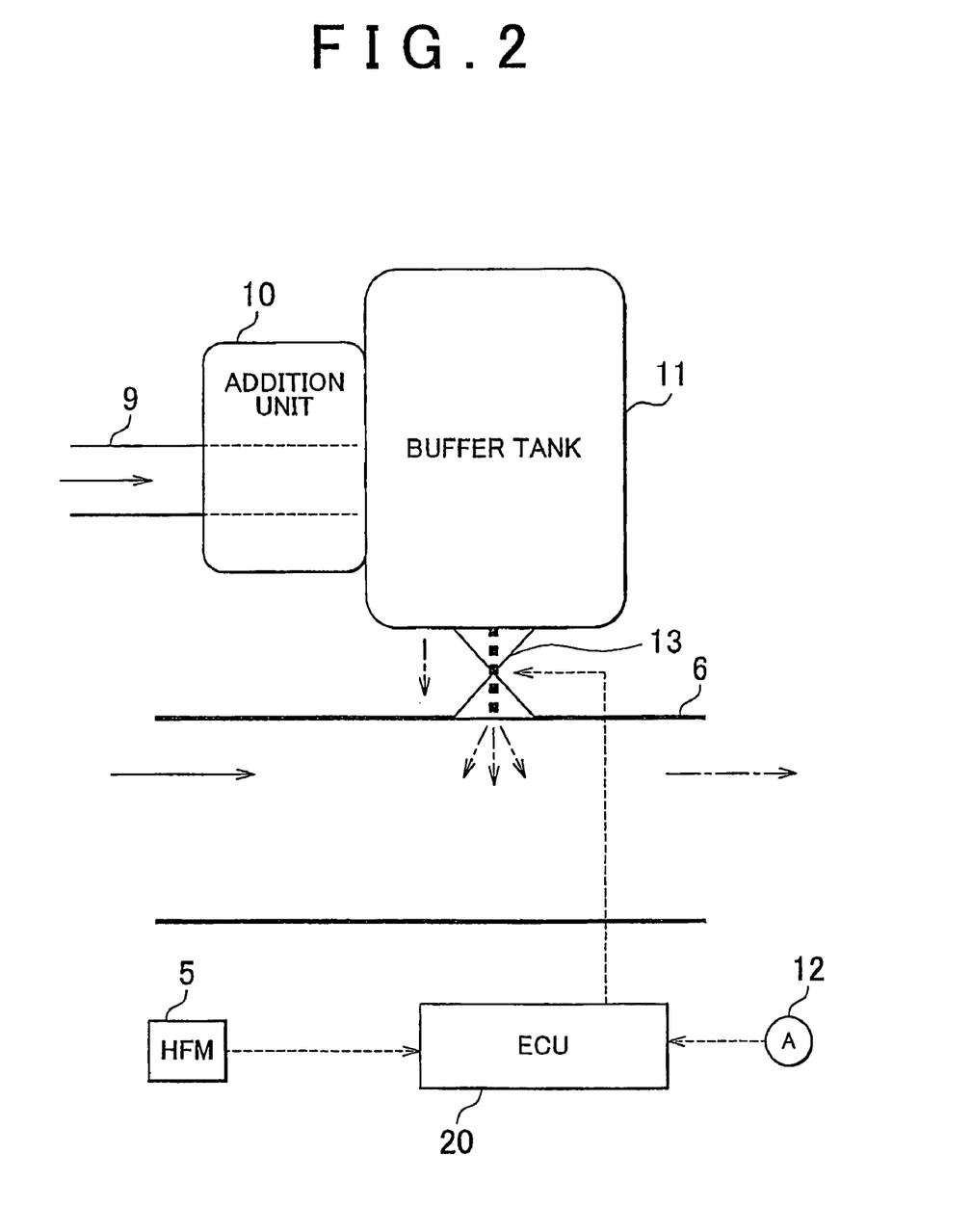
FIG. 2 shows a configuration example 1 of supplying odorizing agent treated hydrogen stored in the buffer tank to a main pipe.
Figure 4:
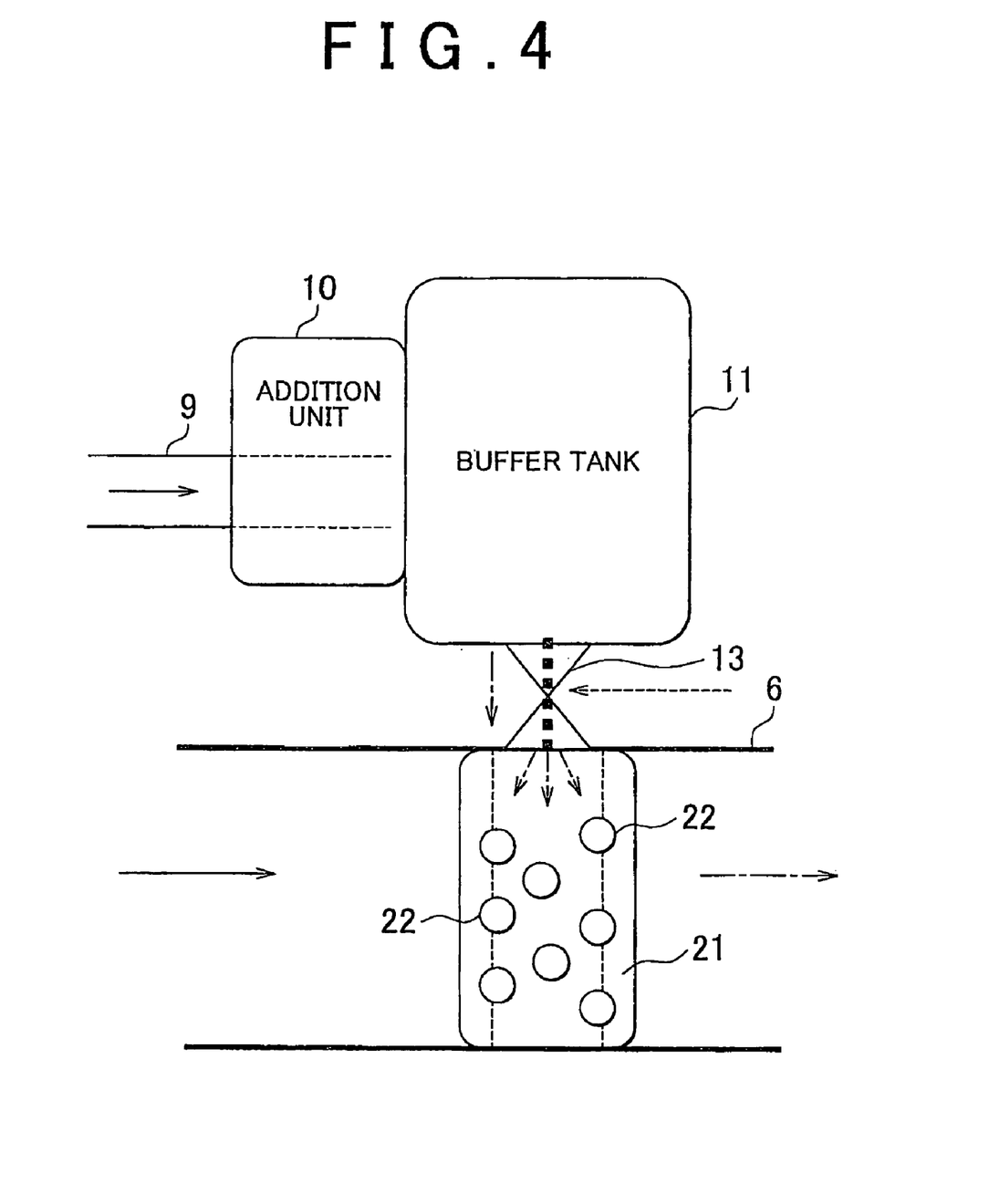
FIG. 4 shows a configuration example 2 of supplying odorizing agent treated hydrogen stored in the buffer tank to the main pipe.

FIG. 2 shows a configuration example 1 in which the injector 13 merely directly injects odorizing agent treated hydrogen gas into the pipe 6. In place of this configuration example 1, the configuration of FIG. 4 (configuration example 2) may be applied. FIG. 4 shows the configuration example 2, in which odorizing agent treated hydrogen gas is supplied to the pipe 6 (main pipe). As shown in FIG. 4, in the configuration example 2, a hollow fiber module 21 is disposed inside the pipe 6, odorizing agent treated hydrogen gas injected from the nozzle of the injector 13 being injected into the hollow fiber module 21.

The hollow fiber module 21 has a cylindrical shape, and has a plurality of through holes 22 on the wall surface in the circumferential direction thereof that communicate with the inside of the hollow fiber module 21. The inside of the hollow fiber module 21 and the inside of the pipe 6 communicate via the holes 22. The odorizing agent treated hydrogen gas that is injected into the hollow fiber module 21 diffuses and then passes through the holes 22 and flows out into the pipe 6, where it mixes with the hydrogen gas flowing in the pipe 6. By applying this type of configuration, it is possible to uniformly mix odorizing agent treated hydrogen gas from the buffer tank 11 with the hydrogen gas flowing in the pipe 6.

By combining the foregoing configuration with injection amount control based on the fuel cell current, in comparison with a configuration (refer to FIG. 2) in which the odorizing agent treated hydrogen gas is directly injected into the pipe 6, finer control is possible of the mixing ratio of hydrogen gas and odorizing agent, and it is possible to achieve a uniform odorizing agent concentration in the odorizing agent treated hydrogen gas supplied to the fuel cell 1. In particular, with the above-described configuration, it is possible to achieve a uniform odorizing agent concentration even if the flow speed of the hydrogen gas flowing in the pipe 6 is not uniform.

Figure 5:
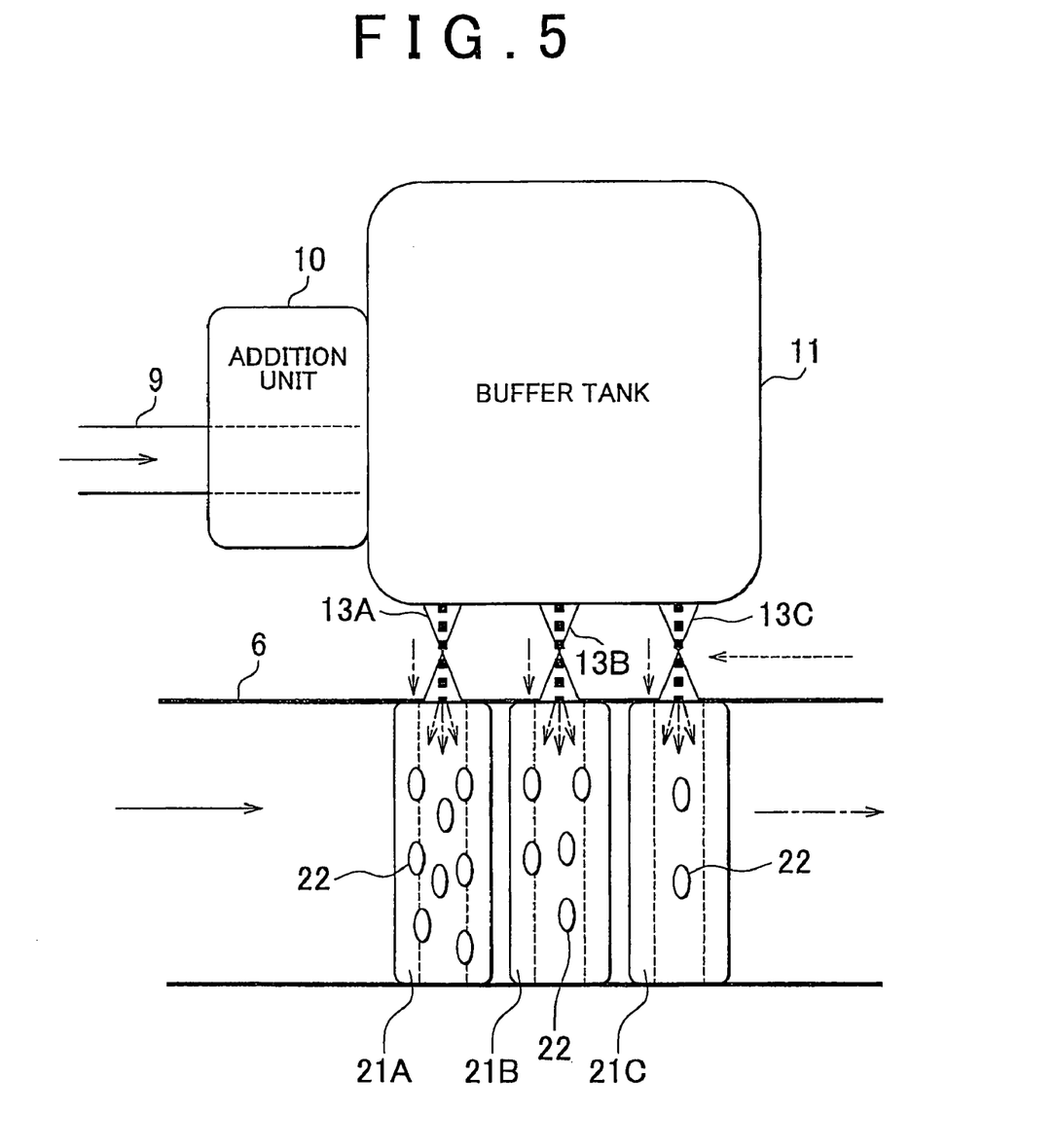
FIG. 5 shows a configuration example 3 of supplying odorizing agent treated hydrogen stored in the buffer tank to the main pipe.

In place of the configuration example 2 shown in FIG. 4, the configuration shown in FIG. 5 may be used. FIG. 5 shows the configuration example 3 related to the supply of odorizing agent treated hydrogen gas to the pipe 6 (main pipe). In the configuration example 3 shown in FIG. 5, a plurality of injectors (shown by example as injectors 13A, 13B, and 13C in FIG. 5) are provided between the buffer tank 11 and the pipe 6 that communicate between these two elements. A plurality of hollow fiber modules 21A, 21B, and 21C are additionally provided paired with the injectors 13A, 13B, and 13C in the pipe 6.

The hollow fiber modules 21A, 21B, and 21C have a plurality of holes 22, which communicate between the inside of the hollow fiber modules and the inside of the pipe 6. The hollow fiber modules 21A, 21B, and 21C are configured to have mutually different aperture surface areas with respect to the pipe 6. For example, the configuration is one in which the ratio of holes in the surface of the modules (the hole density, which is the number of holes per unit surface area) differs between hollow fiber modules. Alternatively, the configuration is one in which the hole diameter differs between hollow fiber modules. Alternatively, the configuration is one in which the hole density and hole diameter differ between hollow fiber modules. The aperture surface area is expressed as the total value of the surface areas of the holes 22. In the example shown in FIG. 5, a configuration is applied in which the aperture surface areas of the hollow fiber modules increase in the sequence of hollow fiber modules 21C, 21B, and 21A. The aperture surface area forms the contact surface area within the module between the odorizing agent treated hydrogen gas and the hydrogen gas in the pipe 6, the configuration being such that, depending upon the hollow fiber module that is used, the contact surface area between the odorizing agent treated hydrogen gas and the hydrogen gas differs.

By adopting the foregoing configurations, for a given same amount of odorizing agent treated hydrogen gas injected from the injectors 13A, 13B, and 13C, the amount of odorizing agent treated hydrogen gas passing through the holes 22 and flowing out from the inside of the pipe 6 differs.

In the configuration example shown in FIG. 5, the ECU 20 executes, for example, the following adjustment of the odorizing agent concentration in the odorizing agent treated hydrogen gas supplied to the fuel cell 1 from the pipe 6. The ECU 20 may execute a control so that the injectors 13A, 13B, and 13C inject odorizing agent treated hydrogen gas in parallel. Alternatively, the ECU 20 may execute a control to select one of the injectors 13A, 13B, and 13C to inject odorizing agent treated hydrogen gas from only the selected injector.

If injection is done in parallel from the injectors 13A, 13B, and 13C, when the amount of added odorizing agent (odorizing agent treated hydrogen gas supply amount) is to be increased (the added amount being determined by the hydrogen gas flow amount), the ECU 20 increases the injection amount (or the number of injections per unit of time) of the injectors 13A, 13B, and 13C. On the other hand, if the amount of added odorizing agent is to be decreased, the ECU 20 decreases the injection amount (or number of injections per unit of time) of the injectors 13A, 13B, and 13C.

In contrast, if one of the injectors 13A, 13B, and 13C is selectively used, when the amount of odorizing agent (the supply amount of odorizing agent treated hydrogen gas) to be added is to be increased, the ECU 20, in response to the amount of the increase, causes only the selected injector paired with a hollow fiber module having a large aperture surface area (for example, the injector 13A, which is paired with the hollow fiber module 21A) to inject odorizing agent treated hydrogen gas. On the other hand, if the amount of odorizing agent to be added is to be decreased, the ECU 20, in response to the amount of the decrease, causes only the selected injector paired with a hollow fiber module having a small aperture surface area (for example, the injector 13C, which is paired with the hollow fiber module 21C) to inject odorizing agent treated hydrogen gas. Even when selectively using the injectors 13A, 13B, and 13C, it is possible to vary the added amount by increasing and decreasing the amount injected (number of injections) by the selected injector.

By the above-described control, the amount of odorizing agent treated hydrogen gas supplied is adjusted in response to the fuel cell current (hydrogen consumption amount), enabling supply to the fuel cell 1 of odorizing agent treated hydrogen gas having a uniform odorizing agent concentration.

Figure 6:
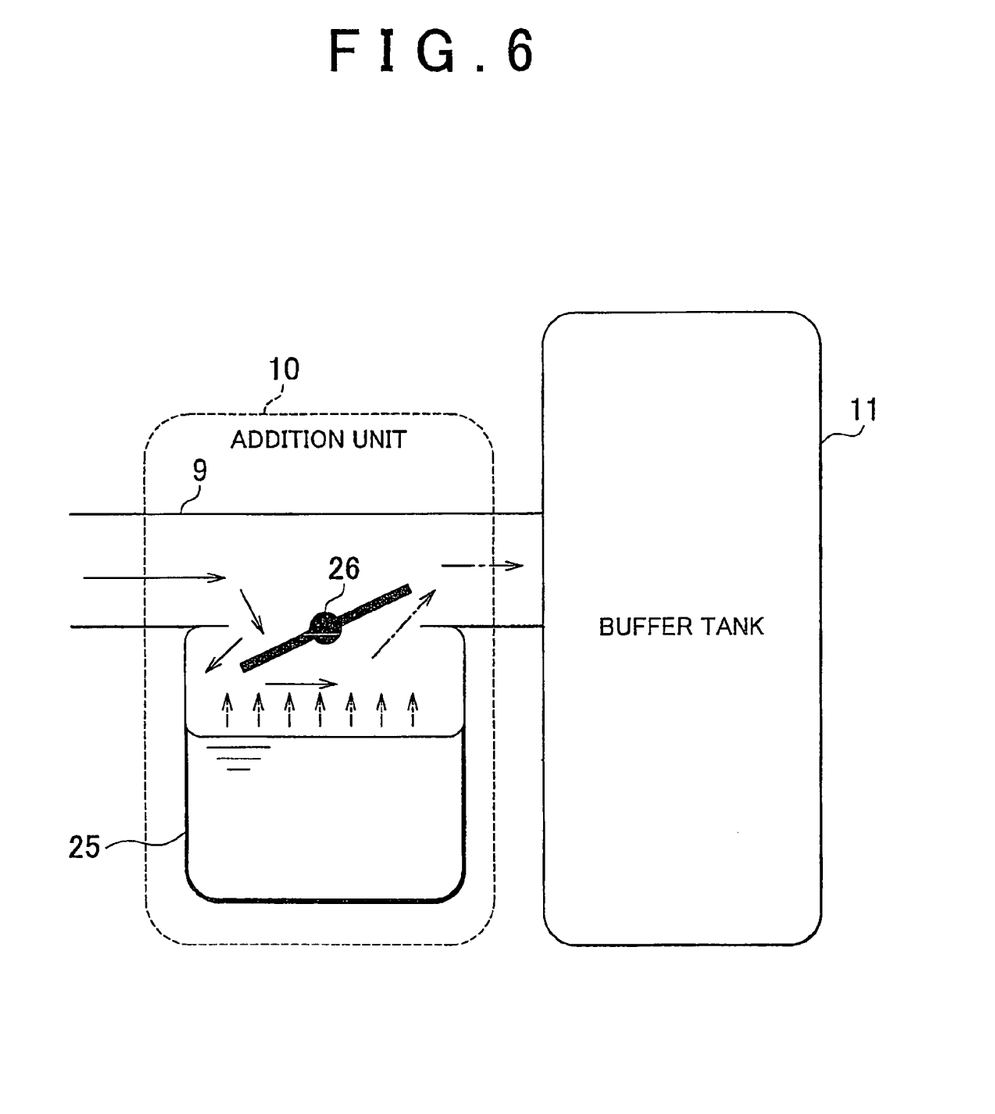
FIG. 6 shows a configuration example 1 of the addition unit shown in FIG. 1.

Examples of the configuration of the addition unit 10 will now be described. FIG. 6 shows configuration example 1 of the addition unit 10. The addition unit 10 shown in FIG. 6 has an odorizing agent tank 25 that is connected to the pipe 9 (sub-pipe) connected to the buffer tank 11, and a butterfly valve 26 (corresponding to a valve in the present invention) that is provided at the boundary part between the odorizing agent tank 25 and the pipe 9. When the butterfly valve 26 is closed, the odorizing agent tank 25 is closed, so that the inside of the pipe 9 and the inside of the odorizing agent tank 25 are blocked. In contrast, when the butterfly valve 26 is open, the inside of the pipe 9 and the inside of the odorizing agent tank 25 communicate with one another.

The operations (amount of opening and time of opening) of the butterfly valve 26 are controlled by, for example, the ECU 20. The ECU 20, in response to the hydrogen gas flow amount measured by the hydrogen flow meter 5, controls the butterfly valve 26 to open more, the larger is the amount of flow of hydrogen gas. Alternatively, the ECU 20 may control the opening time of the butterfly valve 26 per unit of time (for example, the number repetitions of opening and closing the butterfly valve 26).

Odorizing agent is stored in the odorizing agent tank 25, in any of the forms of gas, liquid, or solid (for example, a gel). In this case, the odorizing agent is store in either liquid or gel form. When the butterfly valve 26 is open, a portion of the hydrogen gas flowing in the pipe 9 flows into the odorizing agent tank 25, comes into contact with the surface of the odorizing agent and causes the odorizing agent to evaporate. Additionally, a portion of the hydrogen gas flows again into the pipe 9, to bring away the evaporated gaseous odorizing agent, and reaches the buffer tank 11. In this manner, the butterfly valve 26 forms a flow passage in which a part of the hydrogen flowing in the branching path (pipe 9) is introduced into the odorizing agent tank 25 and, after coming into contact with the odorizing agent in the odorizing agent tank 25, returns the branching path (pipe 9). In this manner, the ECU 20 adjusts the amount of odorizing agent that is added to the hydrogen gas by controlling the amount of opening and/or the opening time per unit of time of the butterfly valve 26.

Figure 7:
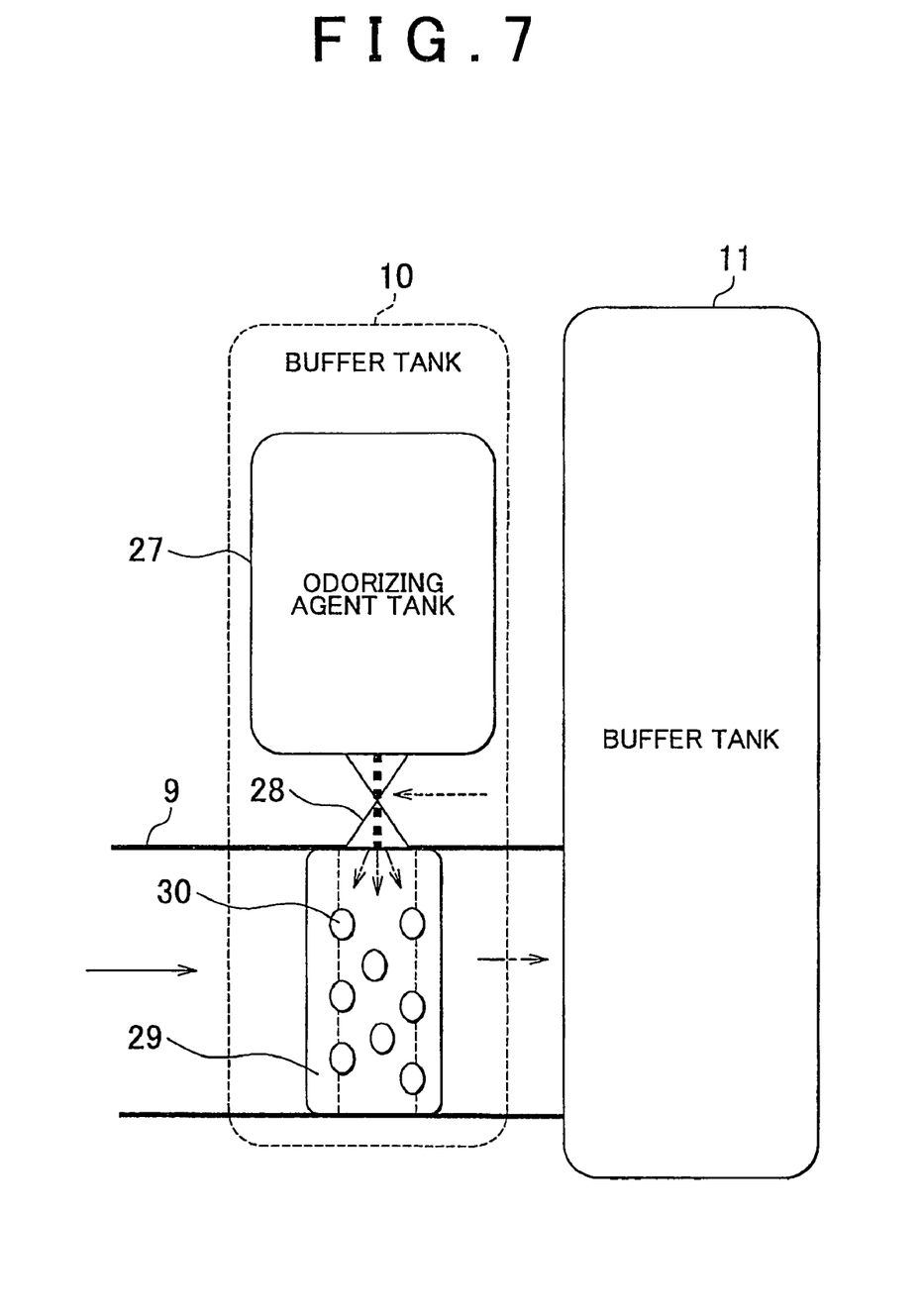
FIG. 7 shows a configuration example 2 of the addition unit shown in FIG. 1.

FIG. 7 shows the configuration example 2 of the addition unit 10. The addition unit 10 shown in FIG. 7 has an odorizing agent 27 that stores odorizing agent, an injector 28 that is disposed between the odorizing agent tank 27 and the pipe 9 (sub-pipe) and that serves as an odorizing agent supplying means, and a hollow fiber module 29 disposed inside the pipe 9. The hollow fiber module 29, similar to the hollow fiber module 21, has a cylindrical shape and has a plurality of (through) holes 30 in the wall surface thereof, the inside of the hollow fiber module 29 and the inside of the pipe 9 communicating via the holes 30.

A nozzle of the injector 28 opens toward the inside of the hollow fiber module 29, and the injector 28 injects odorizing agent into the hollow fiber module 29. The odorizing agent tank 27 stores, for example, odorizing agent in liquid form, and atomized odorizing agent is injected into the hollow fiber module 29 by the injector 28. The odorizing agent injected in the hollow fiber module 29 first remains within the hollow fiber module 29 comes into contact and mixes with the hydrogen gas that passes through the holes 30, flows in the pipe 9, and then reaches the buffer tank 11.

The ECU 20, in accordance with the hydrogen flow amount (measured by the hydrogen flow meter 5) responsive to the fuel cell current value (hydrogen consumption amount), provides a control signal to the injector 28 to control the amount injected thereby. By doing this, it is possible to increase and decrease the amount of odorizing agent that is added, based on the fuel cell current value. By applying the hollow fiber module 29, it is possible to achieve a uniform odorizing agent concentration in the hydrogen gas that reaches the buffer tank 11, thereby contributing to the uniformity of the odorizing agent concentration distribution within the buffer tank 11. By doing this, it is possible to reduce the capacity of the buffer tank 11. Also, as long as the odorizing agent is sufficiently stirred in the buffer tank 11, the hollow fiber module 29 may be omitted.

Figure 8:
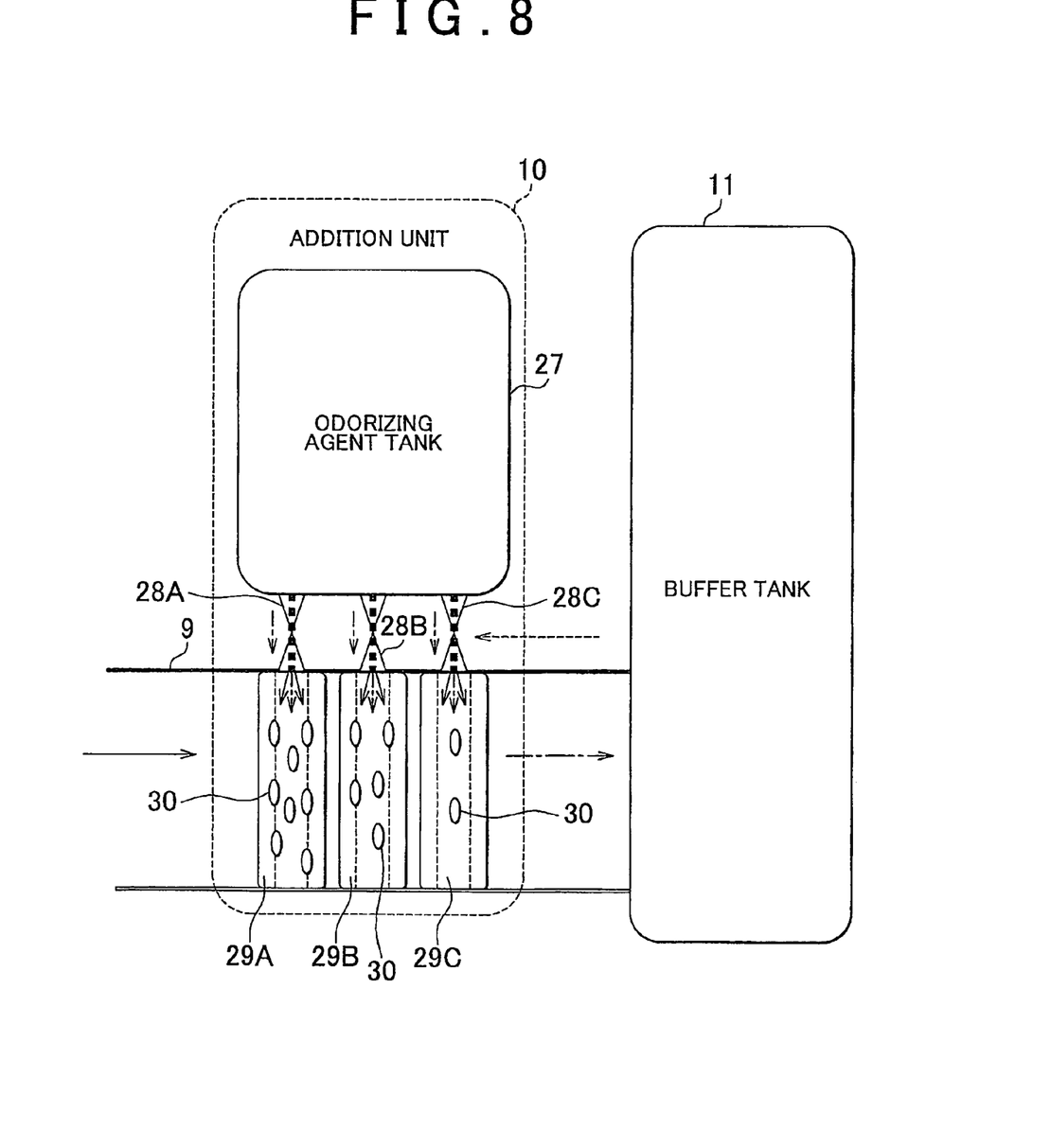
FIG. 8 shows a configuration example 3 of the addition unit shown in FIG. 1.

FIG. 8 shows the configuration example 3 of the addition unit 10. The addition unit 10, shown in FIG. 8, has an odorizing agent tank 27 that stores odorizing agent, a plurality of injectors serving as odorizing agent supplying means (in the case of FIG. 8, injectors 28A, 28B, and 28C) disposed between the odorizing agent tank 27 and the pipe 9 (sub-pipe), and a plurality of hollow fiber modules 29A, 29B, and 29C, paired with the injectors 28A, 28B, and 28C and disposed inside the pipe 9.

The hollow fiber modules 29A, 29B, and 29C have the same type of configuration as the hollow fiber modules 21A, 21B, and 21C, and have holes with aperture surface areas increasing in the sequence of hollow fiber modules 29C, 29B, and 29A. The configuration of the odorizing agent tank 27 is the same as in the configuration example 2.

The ECU 20 is configured to control the injectors 28A, 28B, 28C in parallel or select one injector. If the injectors 28A, 28B, 28C are used in parallel, when the amount of added odorizing agent (the added amount being determined by the hydrogen gas flow amount) is to be increased, the ECU 20 increases the injection amount (or the number of injections per unit of time) of the injectors 28A, 28B, and 28C. On the other hand, if the amount of added odorizing agent is to be decreased, the ECU 20 decreases the injection amount (or number of injections per unit of time) of the injectors 28A, 28B, and 28C.

In contrast, if one of the injectors 28A, 28B, and 28C is selectively used, when the amount of added odorizing agent (the added amount being determined by the hydrogen gas flow amount) is to be increased, the ECU 20, in response to the amount of the increase, causes only the selected injector paired with a hollow fiber module having a large aperture surface area (for example, the injector 28A, which paired with the hollow fiber module 29A) to inject odorizing agent. On the other hand, if the amount of odorizing agent to be added is to be decreased, the ECU 20, in response to the amount of the decrease, causes only the selected injector paired with a hollow fiber module having a small aperture surface area (for example, the injector 28C, which paired with the hollow fiber module 29C) to inject odorizing agent treated hydrogen gas.

By the above-described control, the amount of odorizing agent added is adjusted in accordance with the fuel cell current (hydrogen consumption amount), and it is possible to send into the buffer tank 11 hydrogen gas having a uniform odorizing agent concentration.

In the above-described configuration example 2 and configuration example 3 of the addition unit 10, it is possible to apply an electromagnetic valve in place of the injectors. Also, although the above-described embodiment is for the example of a hydrogen tank 3 that stores high-pressure hydrogen gas, the hydrogen supplying apparatus of this embodiment may also be applied to a hydrogen tank holding a hydrogen-occluding alloy (MH) or a hydrogen tank storing liquid hydrogen. Additionally, the pump 8 may be a valve.

The foregoing embodiment of the present invention suppresses an increase in the size of the apparatus and provides a hydrogen supplying apparatus capable of lengthening the odorizing agent replenishment cycle. The foregoing embodiment also provides a hydrogen supplying apparatus that supplies hydrogen, in which non-uniformity in the odorizing agent concentration is suppressed, to the hydrogen supply target in which non-uniformity in the odorizing agent concentration is suppressed.

The invention claimed is:

1. A fuel cell system including a hydrogen supply apparatus, the fuel cell system comprising:
   a fuel cell;
   a hydrogen tank;
   a hydrogen supply path through which hydrogen from the hydrogen tank is supplied to the fuel cell as a hydrogen supply target;
   a branching path that branches from the hydrogen supply path at a first branching point, in which a portion of the hydrogen supplied from the hydrogen tank flows;
   an addition apparatus that adds an odorizing agent to the hydrogen flowing in the branching path;
   a buffer tank that mixes and stores the odorizing agent treated hydrogen; and
   a supplying apparatus that supplies the odorizing agent treated hydrogen mixed and stored in the buffer tank to the hydrogen supply path at a second branching point located in the hydrogen supply path downstream from the first branching point so that the odorizing agent treated hydrogen flows to the fuel cell,
   wherein the addition apparatus is located in the branching path downstream of the first branching point and upstream of the buffer tank so that the odorizing agent is added to the hydrogen flowing in the branching path before the hydrogen enters the buffer tank.

2. The fuel cell system according to claim 1, wherein the supplying apparatus supplies the odorizing agent treated hydrogen to the hydrogen supply path, in accordance with a hydrogen consumption amount in the hydrogen supply target.

3. The fuel cell system according to claim 2, wherein the supplying apparatus supplies more odorizing agent treated hydrogen to the hydrogen supply path as the amount of hydrogen consumed by the hydrogen supply target increases.

4. The fuel cell system according to claim 1, wherein the supplying apparatus supplies an amount of the odorizing agent treated hydrogen, which is determined based on a generated electrical current in the hydrogen supply target, to the hydrogen supply path.

5. The fuel cell system according to claim 4, wherein the supplying apparatus supplies more odorizing agent treated hydrogen to the hydrogen supply path as the electrical current generated by the hydrogen supply target increases.

6. The fuel cell system according to claim 1, further comprising:
   a hollow fiber module disposed in the hydrogen supply path, having an aperture with respect to the hydrogen supply path, and wherein
   the supplying apparatus supplies the odorizing agent treated hydrogen into the hollow fiber module.

7. The fuel cell system according to claim 1, further comprising:
   an adjusting apparatus that adjusts a contact surface area between the hydrogen flowing in the hydrogen supply path and the odorizing agent treated hydrogen that is supplied into the hydrogen supply path by the supplying apparatus.

8. The fuel cell system according to claim 1, further comprising:
   a plurality of hollow fiber modules disposed in the hydrogen supply path, having apertures with respect to the hydrogen supply path, wherein each hollow fiber module has a different aperture surface area, and wherein the supplying apparatus includes a plurality of supply inlets that supply the odorizing agent treated hydrogen into the hollow fiber modules.

9. The fuel cell system according to claim 1, further comprising:
   a hydrogen flow amount measuring apparatus that is disposed upstream from the first branching point of the hydrogen supply path and the branching path, wherein the addition apparatus adds an odorizing agent in accordance with a hydrogen flow amount measured by the hydrogen flow amount measuring apparatus.

10. The fuel cell system according to claim 9, wherein the addition apparatus adds more odorizing agent as the hydrogen flow amount measured by the hydrogen flow amount measuring apparatus increases.

11. The fuel cell system according to claim 1, wherein the addition apparatus includes
   an odorizing agent tank that stores an odorizing agent, and
   a valve that blocks a flow between the branching path and the odorizing agent tank when closed, and that forms a flow passage in which a portion of the hydrogen flowing in the branching path is introduced into the odorizing agent tank when open and, after coming into contact with the odorizing agent in the odorizing agent tank, returns to the branching path.

12. The fuel cell system according to claim 1, wherein the addition apparatus includes
   an odorizing agent tank that stores an odorizing agent,
   a hollow fiber module disposed in the branching path and having an aperture opening with respect to the branching path, and
   an odorizing agent supplying apparatus that supplies the odorizing agent in the odorizing agent tank into the hollow fiber module.

13. The fuel cell system according to claim 1, wherein the addition apparatus includes
   an odorizing agent tank that stores an odorizing agent, a plurality of hollow fiber modules disposed in the branching path and having apertures opening with respect to the branching path, and a plurality of odorizing agent supplying apparatuses that supply the odorizing agent in the odorizing agent tank into the hollow fiber modules, wherein the plurality of hollow fiber modules have mutually different aperture surface areas.

14. A method for controlling hydrogen supply in the fuel cell system according to claim 1 comprising:

supplying the odorizing agent treated hydrogen to the hydrogen supply path, in accordance with a hydrogen consumption amount in the hydrogen supply target.

15. The method for controlling hydrogen supply according to claim 14, wherein more odorizing agent treated hydrogen is supplied to the hydrogen supply path as the amount of hydrogen consumed by the hydrogen supply target increases.

16. The method for controlling hydrogen supply in the fuel cell system according to claim 1 comprising:

supplying an amount of the odorizing agent treated hydrogen to the hydrogen supply path, in accordance with a generated electrical current in the hydrogen supply target.

17. The method for controlling hydrogen supply according to claim 16, wherein more odorizing agent treated hydrogen is supplied to the hydrogen supply path as the electrical current generated by the hydrogen supply target increases.

18. The method for controlling hydrogen supply in the fuel cell system according to claim 1 comprising:

adding an amount of odorizing agent that is in accordance with a hydrogen flow amount that flows upstream of the first branching point of the hydrogen supply path and the branching path.

19. The method for controlling hydrogen supply according to claim 18, wherein more odorizing agent is added as the hydrogen flow amount that flows upstream of the first branching point of the hydrogen supply path and the branching path increases.

* * * * *